United States Patent
Moyal et al.

(10) Patent No.: US 12,266,263 B2
(45) Date of Patent: Apr. 1, 2025

(54) DYNAMIC CREATION OF VEHICLE FENCE FOR EMERGENCY VEHICLE MOVEMENT

(71) Applicant: INTERNATIONAL BUSINESS MACHINES CORPORATION, Armonk, NY (US)

(72) Inventors: Shailendra Moyal, Pune (IN); Akash U. Dhoot, Pune (IN); Sarbajit K. Rakshit, Kolkata (IN); Partho Ghosh, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 300 days.

(21) Appl. No.: 17/811,981

(22) Filed: Jul. 12, 2022

(65) Prior Publication Data

US 2024/0021075 A1    Jan. 18, 2024

(51) Int. Cl.
| | |
|---|---|
| *G08G 1/01* | (2006.01) |
| *B60W 30/18* | (2012.01) |
| *B60W 40/04* | (2006.01) |
| *B60W 60/00* | (2020.01) |
| *G08G 1/00* | (2006.01) |
| *G08G 1/048* | (2006.01) |
| *G08G 1/052* | (2006.01) |
| *G08G 1/09* | (2006.01) |

(52) U.S. Cl.
CPC ..... *G08G 1/0145* (2013.01); *B60W 30/18009* (2013.01); *B60W 40/04* (2013.01);
(Continued)

(58) Field of Classification Search
CPC .. G08G 1/0145; G08G 1/0112; G08G 1/0125; G08G 1/048; G08G 1/052;
(Continued)

(56) References Cited

U.S. PATENT DOCUMENTS 10,896,606 B1   1/2021 Hayes
2018/0136895 A1* 5/2018 Harris ................. B60R 11/0229
(Continued)

OTHER PUBLICATIONS

Disclosed Anonymously, "A warning system for more effective alerting as an emergency vehicle approaches a crosswalk", IP.com, IPCOM000262025D, Apr. 26, 2020, 4 Pages. https://priorart.ip.com/IPCOM/000262025.

(Continued)

*Primary Examiner* — Hussein Elchanti
*Assistant Examiner* — Micah Chuen-Him Cheng
(74) *Attorney, Agent, or Firm* — Robert R. Aragona (57) ABSTRACT

An embodiment for dynamically creating a vehicle fence is provided. The embodiment may include receiving GPS data from one or more vehicles and a real-time video feed of one or more intersections along a first roadway. The embodiment may also include identifying a number of autonomous vehicles and one or more routes of the autonomous vehicles traveling on the first roadway. The embodiment may further include in response to determining an emergency vehicle is traveling on the first roadway, identifying a route and speed of the emergency vehicle. The embodiment may also include estimating a width of a second roadway intersecting the first roadway at a nearest intersection. The embodiment may further include identifying a moving direction of one or more objects along the second roadway. The embodiment may also include deploying a required number of autonomous vehicles to block the one or more objects from entering the nearest intersection.

17 Claims, 7 Drawing Sheets

(52) U.S. Cl.
CPC ....... *B60W 60/0027* (2020.02); *G08G 1/0112* (2013.01); *G08G 1/0125* (2013.01); *G08G 1/048* (2013.01); *G08G 1/052* (2013.01); *G08G 1/09* (2013.01); *G08G 1/207* (2013.01); *B60W 2554/4029* (2020.02); *B60W 2556/45* (2020.02)

(58) Field of Classification Search
CPC ........ G08G 1/09; G08G 1/207; G08G 1/0965; B60W 30/18009; B60W 40/04; B60W 60/0027; B60W 2554/4029; B60W 2556/45
See application file for complete search history.

(56) References Cited

U.S. PATENT DOCUMENTS

| | | |
|---|---|---|
| 2018/0233047 A1 | 8/2018 | Mandeville-Clarke |
| 2019/0035269 A1 | 1/2019 | Donovan |
| 2019/0279513 A1* | 9/2019 | Schuh ...................... G08G 1/22 |
| 2020/0097023 A1* | 3/2020 | Grundey .............. G05D 1/0293 |
| 2021/0056840 A1* | 2/2021 | Yamazaki .............. G08G 1/095 |
| 2021/0192945 A1* | 6/2021 | Kaneichi ................ G08G 1/081 |
| 2022/0237919 A1* | 7/2022 | Li ...................... G01C 21/3602 |

OTHER PUBLICATIONS

Disclosed Anonymously, "Method and control arrangement for avoiding a vehicle platoon to interfere with an emergency vehicle", IP.com, IPCOM000257619D, Feb. 25, 2019, 28 Pages, https://priorart.ip.com/IPCOM/000257619.

Disclosed Anonymously, "Method and system for automatically re-routing vehicles to avoid a critical path of an emergency vehicle", IP.com, IPCOM000253793D, May 4, 2018, 2 Pages. https://priorart.ip.com/IPCOM/000253793.

Mell et al., "The NIST Definition of Cloud Computing", Recommendations of the National Institute of Standards and Technology, NIST Special Publication 800-145, Sep. 2011, 7 pages.

* cited by examiner

DYNAMIC CREATION OF VEHICLE FENCE FOR EMERGENCY VEHICLE MOVEMENT

BACKGROUND

The present invention relates generally to the field of computing, and more particularly to a system for dynamically creating a vehicle fence for emergency vehicle movement.

Autonomous vehicles have become popular in recent years and are considered to be the future mode of transportation. Many autonomous vehicles are already in functional use around the world, such as automated people movers at airports, automated subway trains, and autonomous (i.e., self-driving) cars. In particular, autonomous cars may include vehicles used for personal reasons (i.e., passenger cars), ride-share cars, as well as emergency vehicles, such as ambulances, tow trucks, and fire trucks. As technology continues to improve, autonomous cars are expected to account for a majority of vehicles on roadways by mid-century as well as reduce traffic congestion on roadways.

SUMMARY

According to one embodiment, a method, computer system, and computer program product for dynamically displaying images based on textual content is provided. The embodiment may include receiving GPS data from one or more vehicles in a surrounding environment and a real-time video feed of one or more intersections along a first roadway. The embodiment may also include identifying a number of autonomous vehicles and one or more routes of the autonomous vehicles traveling on the first roadway based on the GPS data. The embodiment may further include in response to determining an emergency vehicle is traveling on the first roadway, identifying a route and a speed of the emergency vehicle based on the GPS data. The embodiment may also include estimating a width of a second roadway intersecting the first roadway at a nearest intersection to the emergency vehicle based on the real-time video feed. The embodiment may further include identifying a moving direction of one or more objects along the second roadway based on the real-time video feed. The embodiment may also include detecting a time at which the emergency vehicle will reach the nearest intersection, and a duration to clear the nearest intersection based on the route and the speed of the emergency vehicle. The embodiment may further include identifying a required number of the autonomous vehicles to block the one or more objects from entering the nearest intersection based on the width of the second roadway. The embodiment may also include deploying the required number of the autonomous vehicles to block the one or more objects from entering the nearest intersection prior to the emergency vehicle reaching the nearest intersection. The embodiment may further include clearing each of the deployed autonomous vehicles from the nearest intersection.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for dynamically creating a vehicle fence for emergency vehicle movement. The following described exemplary embodiments provide a system, method, and program product to, among other things, identify a required number of autonomous vehicles to block one or more objects from entering a nearest intersection and, accordingly, deploy the required number of autonomous vehicles to block the one or more objects from entering the nearest intersection. Therefore, the present embodiment has the capacity to improve traffic management technology by dynamically creating a vehicle-based fence to prevent accidents at a roadway intersection.

As previously described, autonomous vehicles have become popular in recent years and are considered to be the future mode of transportation. Many autonomous vehicles are already in functional use around the world, such as automated people movers at airports, automated subway trains, and autonomous (i.e., self-driving) cars. In particular, autonomous cars may include vehicles used for personal reasons (i.e., passenger cars), ride-share cars, as well as emergency vehicles, such as ambulances, tow trucks, and fire trucks. As technology continues to improve, autonomous cars are expected to account for a majority of vehicles on roadways by mid-century as well as reduce traffic congestion on roadways. In any roadway, there may be a variety of intersections where pedestrians, bicycles, and/or vehicles are crossing the roadway. When an emergency vehicle is approaching the intersection, the emergency vehicle may not stop at a traffic signal, which may cause a collision or accident. This problem is typically addressed by rerouting vehicles to avoid the path of the emergency vehicle. However, rerouting vehicles causes longer travel times and fails to prevent pedestrians and animals from crossing the roadway.

It may therefore be imperative to have a system in place to proactively prevent collisions or accidents when an emergency vehicle is approaching an intersection. Thus, embodiments of the present invention may provide advantages including, but not limited to, dynamically creating a vehicle-based fence to prevent accidents at a roadway intersection, proactively taking action to remove moving objects from an intersection, and enabling emergency vehicles to reach their destination faster. The present invention does not require that all advantages need to be incorporated into every embodiment of the invention.

According to at least one embodiment, when vehicles are being driven in any given area, GPS data from one or more vehicles in a surrounding environment and a real-time video feed of one or more intersections along a first roadway may be received in order to identify a number of autonomous vehicles and one or more routes of the autonomous vehicles traveling on the first roadway based on the GPS data. Then, in response to determining an emergency vehicle is traveling on the first roadway, a route and a speed of the emergency vehicle may be identified based on the GPS data. Upon identifying the route and the speed of the emergency vehicle, a width of a second roadway intersecting the first roadway at a nearest intersection to the emergency vehicle may be estimated based on the real-time video feed such that a moving direction of one or more objects along the second roadway may be identified. Then, a time at which the emergency vehicle will reach the nearest intersection and a duration to clear the nearest intersection may be detected based on the route and the speed of the emergency vehicle. A required number of the autonomous vehicles to block the one or more objects from entering the nearest intersection may be identified so that the required number of autonomous vehicles may be deployed to block the one or more objects prior to the emergency vehicle reaching the nearest intersection. Each of the deployed autonomous vehicles may be cleared from the nearest intersection after the emergency vehicle clears the nearest intersection.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify a required number of autonomous vehicles to block one or more objects from entering a nearest intersection and, accordingly, deploy the required number of autonomous vehicles to block the one or more objects from entering the nearest intersection.

Figure 1:
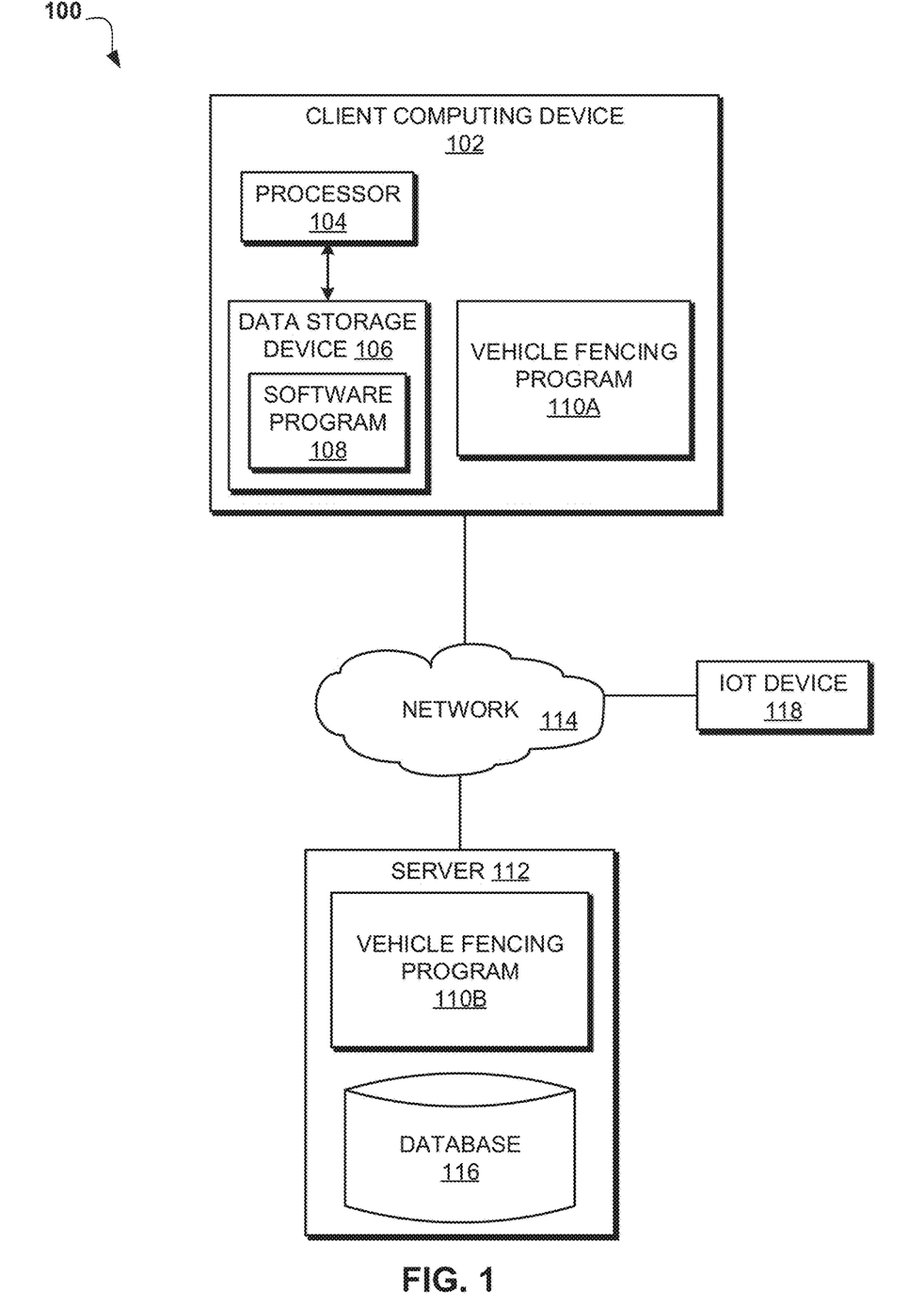
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a vehicle fencing program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a vehicle fencing program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be an autonomous vehicle, a GPS-enabled device internal or external to the autonomous vehicle, a traffic camera, motion sensors, and/or any other IoT Device 118 known in the art for detecting vehicles and objects that is capable of connecting to the communication network 114, and transmitting and receiving data with the client computing device 102 and the server 112.

According to the present embodiment, the vehicle fencing program 110A, 110B may be a program capable of receiving GPS data from one or more vehicles and a real-time video feed of one or more intersections along a first roadway, identifying a required number of autonomous vehicles to block one or more objects from entering a nearest intersection, deploying the required number of autonomous vehicles to block the one or more objects from entering the nearest intersection, dynamically creating a vehicle-based fence to prevent accidents at a roadway intersection, proactively taking action to remove moving objects from the intersection, and enabling emergency vehicles to reach their destination faster. The vehicle fencing method is explained in further detail below with respect to FIGS. 2A and 2B.

Figure 2A:
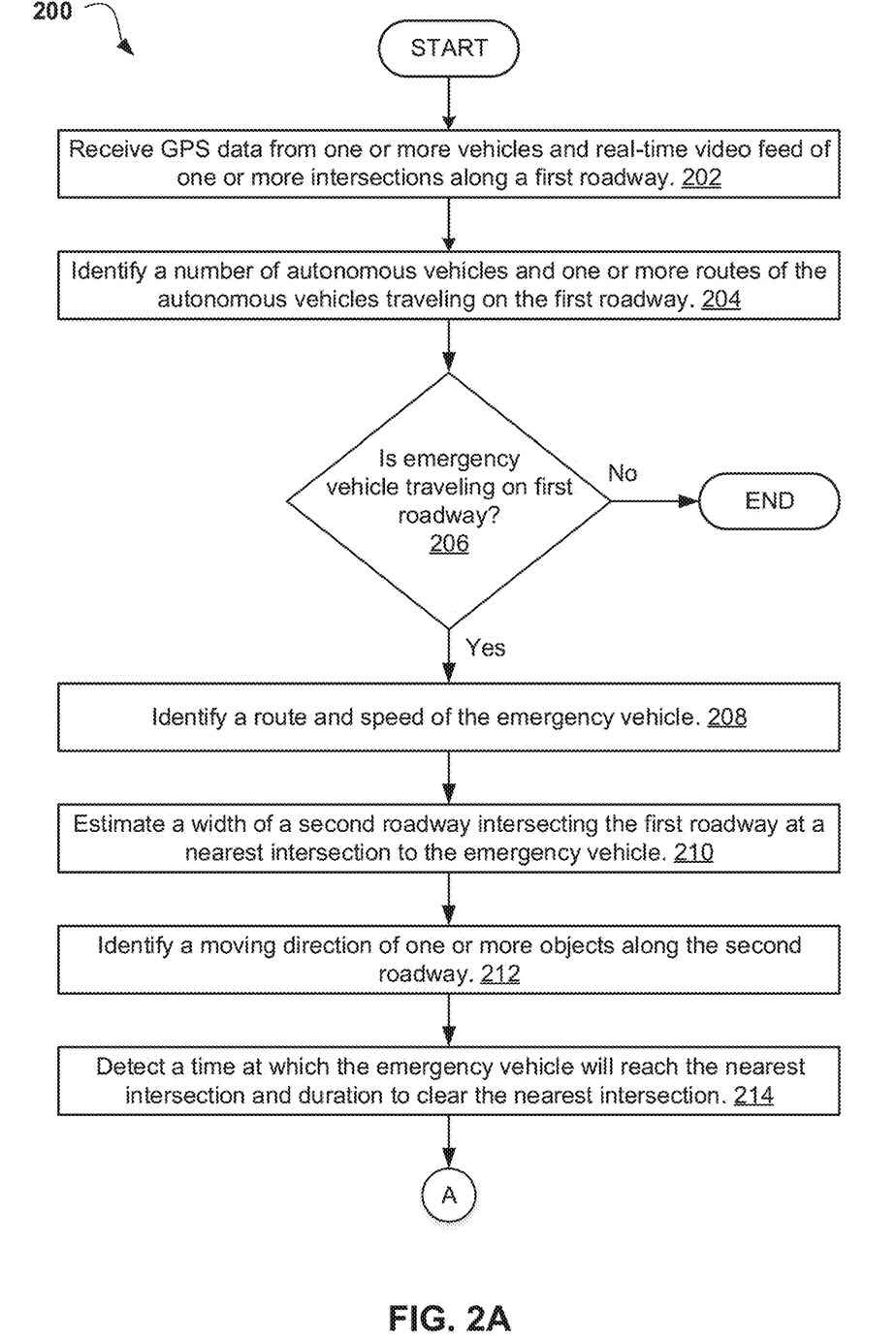
FIGS. 2A and 2B illustrate an operational flowchart for dynamically creating a vehicle fence for emergency vehicle movement in a dynamic vehicle fence creation process according to at least one embodiment.
Figure 2B:
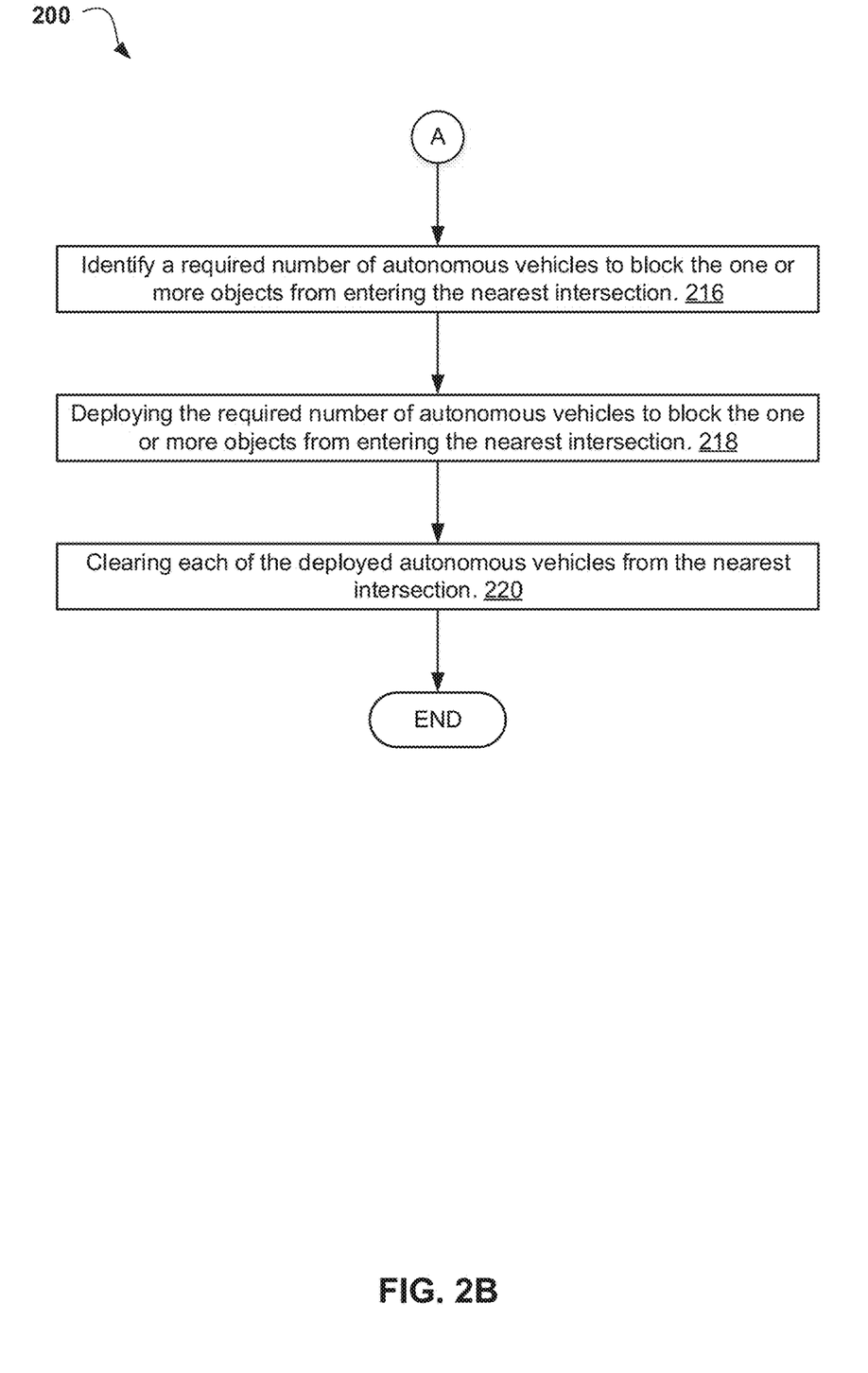

Referring now to FIGS. 2A and 2B, an operational flowchart for dynamically creating a vehicle fence for emergency vehicle movement in a dynamic vehicle fence creation process 200 is depicted according to at least one embodiment. At 202, the vehicle fencing program 110A, 110B receives the GPS data from the one or more vehicles in the surrounding environment and the real-time video feed of the one or more intersections along the first roadway. The one or more vehicles may include the autonomous vehicles as well as vehicles driven by humans.

The GPS data may include, but is not limited to, information such as a map of the surrounding environment (e.g., a city, town, or rural area), a route of the one or more vehicles, a speed of the one or more vehicles, and/or a vehicle type of the one or more vehicles (e.g., a passenger vehicle, commercial vehicle, or emergency vehicle). The GPS data may be received by the vehicle fencing program 110A, 110B when the one or more vehicles are actively navigating to a programmed destination.

According to at least one embodiment, the real-time video feed of the one or more intersections along the first roadway may be received from the IoT Device 118, such as the traffic camera, that is permanently focused on the one or more intersections. For example, the traffic camera may be mounted on a traffic light above the intersection or may be mounted on a pole on one or more sides of the intersection. According to at least one other embodiment, the real-time video feed of the one or more intersections along the first roadway may be received from the one or more vehicles themselves. For example, the one or more vehicles may be equipped with a dashboard camera capable of capturing video. The real-time video feed may include video of roadway conditions at the one or more intersections, as well as movements of one or more objects at the one or more intersections, described in further detail below with respect to step 212.

Then, at 204, the vehicle fencing program 110A, 110B identifies the number of autonomous vehicles and the one or more routes of the autonomous vehicles traveling on the first roadway. The number and routes of the autonomous vehicles travelling on the first roadway are identified based on the GPS data. As described above with respect to step 202, the GPS data may include the vehicle type of the one or more vehicles. The vehicle type may include a designation of whether the vehicle is an autonomous vehicle or a human-driven vehicle. According to at least one embodiment, when the GPS system is embedded in the vehicle (i.e., an in-dash GPS system), the manufacturer of the vehicle may indicate whether the GPS system is for an autonomous vehicle or a human-driven vehicle. According to at least one other embodiment, a user may indicate, via a graphical user interface (GUI) on their device or the infotainment screen of the vehicle, whether the vehicle is autonomous or human-driven. Similarly, as described above with respect to step 202, the one or more routes of the autonomous vehicles may be identified when the autonomous vehicles are actively navigating to the programmed destination. For example, when an autonomous vehicle is navigating to 123 Main Street from a current location, the GPS data may include a list of roadways to use to arrive at the desired destination.

Next, at 206, the vehicle fencing program 110A, 110B determines whether the emergency vehicle is travelling on the first roadway. Examples of emergency vehicles include, but are not limited to, ambulances, tow trucks, and fire trucks. It may be appreciated that in embodiments of the present invention, the emergency vehicle may be an autonomous vehicle or a human-driven vehicle.

According to at least one embodiment, the determination may be made based on a sound emanating from the one or more vehicles. For example, at least one vehicle may be generating a siren sound, which may be heard by the autonomous vehicles traveling on the first roadway. This siren sound may indicate that there is the emergency vehicle traveling on the first roadway. According to at least one other embodiment, the determination may be made based on any markings on the one or more vehicles. These markings may be words. For example, at least one vehicle may have words such as "Police," "Ambulance," or "Fire" written on one or more surfaces of the vehicle. Alternatively, these markings may be symbols or stripes associated with an emergency vehicle. For example, alternating red and yellow stripes may indicate that the vehicle is an ambulance. According to at least one further embodiment, the determination may be made based on the GPS data. As described above with respect to step 202, the GPS data may include a vehicle type of the one or more vehicles. It may be appreciated that the examples described above are not intended to be limiting, and that in embodiments of the present invention a variety of sounds and/or markings may be used to distinguish emergency vehicles from other types of vehicles.

In response to determining the emergency vehicle is traveling on the first roadway (step 206, "Yes" branch), the dynamic vehicle fence creation process 200 proceeds to step 208 to identify a route and a speed of the emergency vehicle based on the GPS data. In response to determining the emergency vehicle is not traveling on the first roadway (step 206, "No" branch), the dynamic vehicle fence creation process 200 ends, since there would be no need to create the vehicle-based fence.

Then, at 208, the vehicle fencing program 110A, 110B identifies the route and the speed of the emergency vehicle. Once the emergency vehicle is identified, the route and the speed of the emergency vehicle are identified based on the GPS data. The GPS system of the emergency vehicle may transmit the route and the speed of the emergency vehicle to the vehicle fencing program 110A, 110B. The route and the speed of the emergency vehicle may be utilized to estimate the time at which the emergency vehicle will reach the nearest intersection, described in further detail below with respect to step 214.

Figure 3:
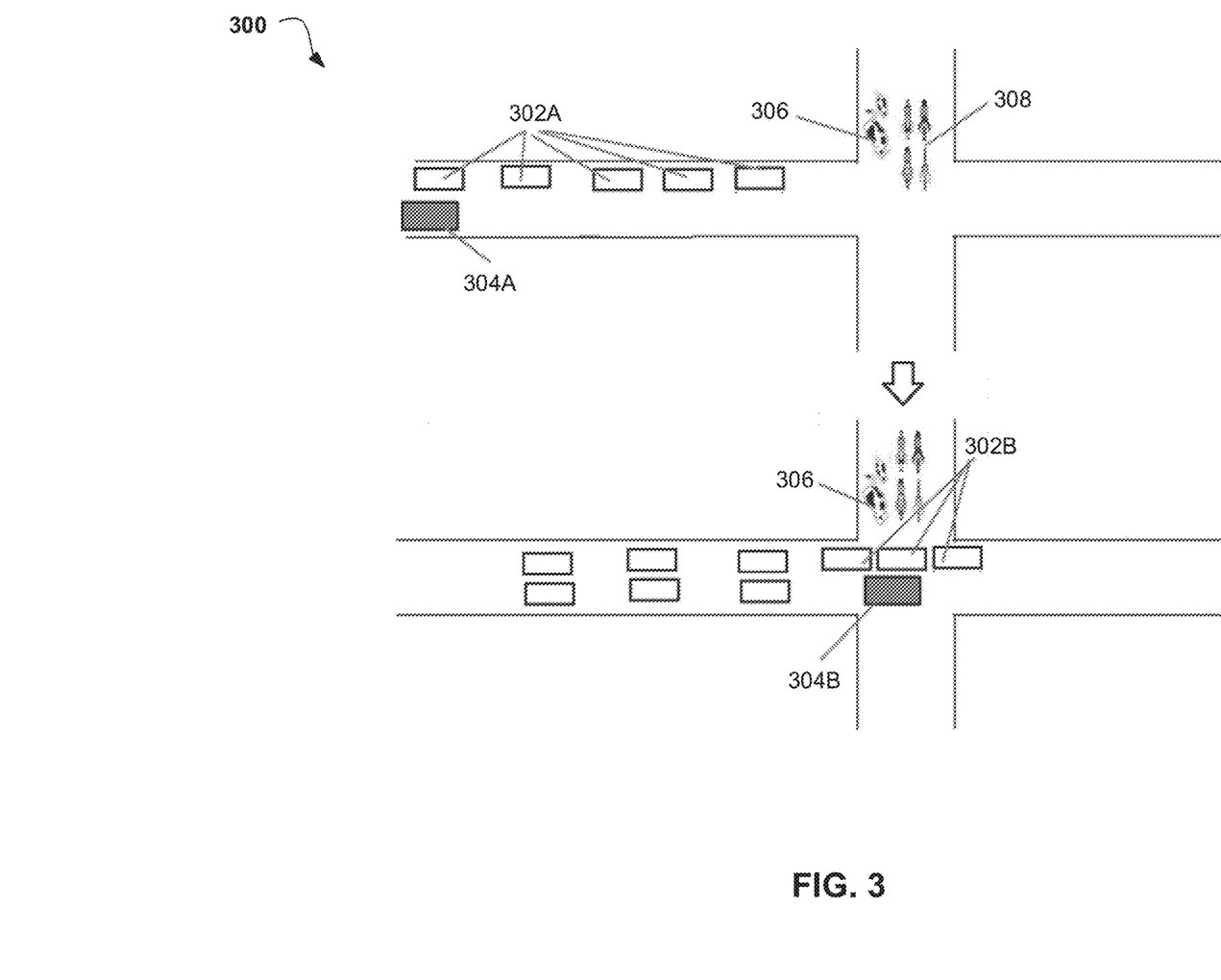
FIG. 3 is an exemplary diagram depicting autonomous vehicles forming a vehicle fence for safe movement of an emergency vehicle according to at least one embodiment.

Next, at 210, the vehicle fencing program 110A, 110B estimates the width of the second roadway intersecting the first roadway at the nearest intersection to the emergency vehicle. The width of the second roadway is estimated based on the real-time video feed. The second roadway may intersect the first roadway at a 90° angle (i.e., the second roadway may be perpendicular to the first roadway), as illustrated in FIG. 3. Alternatively, the second roadway may intersect the first roadway an angle other than 90°.

As described above with respect to step 202, the real-time video feed may include video of roadway conditions at the one or more intersections. These roadway conditions may include a number of lanes in the second roadway detected by patterns of lines on the second roadway. For example, a double solid yellow line may designate the midpoint of the second roadway where traffic is moving in different directions, while a broken white line may designate lanes where traffic is moving in the same direction. The width of the second roadway may thus be estimated based on the number of white lines and yellow lines, since each lane of any roadway has to be at least wide enough to fit a vehicle. For example, double yellow lines with no white lines may indicate a single lane roadway. In another example, double yellow lines and broken white lines on both sides of the double yellow lines may indicate a two-lane roadway in each direction.

According to at least one other embodiment, where the surrounding environment is a city or suburban environment with frequently traveled roadways, the width of each of the roadways in the surrounding environment may be pre-defined and stored in a database, such as the database 116. In this embodiment, the vehicle fencing program 110A, 110B may estimate the width of the second roadway by querying the database storing these pre-defined values.

Then, at 212, the vehicle fencing program 110A, 110B identifies the moving direction of the one or more objects along the second roadway. The moving direction of the one or more objects are identified based on the real-time video feed. As used herein, objects include, but are not limited to, pedestrians, bicycles, animals, and/or other vehicles that are attempting to cross the first roadway in the direction of the second roadway, as illustrated in FIG. 3. The real-time video feed may include live images of the one or more objects moving around at the nearest intersection. The moving direction of the one or more objects may be identified from these live images.

According to at least one other embodiment, the moving direction of the one or more objects may be identified based on the map of the roadways in the surrounding area. These maps may indicate whether the roadway is a one-way street or a two-way street. Thus, for objects legally required to follow the flow of traffic on a roadway, such as bicycles and other vehicles, the map may indicate the moving direction of these objects at the nearest intersection.

Next, at 214, the vehicle fencing program 110A, 110B detects the time at which the emergency vehicle will reach the nearest intersection, and a duration to clear the nearest intersection. The time and the duration are detected based on the route and the speed of the emergency vehicle. Utilizing the GPS data, which may include traffic conditions as well as the speed and heading of the emergency vehicle, the vehicle fencing program 110A, 110B may predict an estimated time of arrival (ETA) of the emergency vehicle at a specific location from any current location. In this embodiment, the specific location may be the nearest intersection to the emergency vehicle. Similarly, the speed and heading of the emergency vehicle may indicate a time required to pass through the nearest intersection. For example, due to traffic conditions at the nearest intersection, it may take the emergency vehicle three seconds to clear the nearest intersection when traveling in a westbound direction, but only 1.5 seconds when traveling in an eastbound direction.

According to at least one other embodiment, once the time and duration are detected, a notification may be sent so the one or more vehicles in the surrounding environment having connected service capabilities informing the one or more vehicles about a context of an emergency. For example, a pop-up notification on the navigation screen of the one or more vehicles may say, "Ambulance is approaching from 100 feet away in the left lane." In this manner, any human-driven vehicles may proactively depart from the lane.

Then, at 216, the vehicle fencing program 110A, 110B identifies the required number of autonomous vehicles to block the one or more objects from entering the nearest intersection. The required number of autonomous vehicles is identified based on the width of the second roadway. A wider second roadway may require more autonomous vehicles to create the vehicle fence than a narrower second roadway. As described above with respect to step 210, the width of the second roadway may be estimated based on the number of white lines and yellow lines, since each lane of any roadway has to be at least wide enough to fit a vehicle. Therefore, for example, for a single lane roadway going in two directions, the required number of autonomous vehicles may be two. In another example, for a two-lane roadway going in two directions, the required number of autonomous vehicles may be four. According to at least one other embodiment, where the width of each of the roadways in the surrounding environment may be pre-defined and stored in a database, the required number of autonomous vehicles may be identified based on the pre-defined values. It may be appreciated that the examples described above are not intended to be limiting, and that in embodiments of the present invention the required number of autonomous vehicles may vary based on the configurations of different intersections.

According to at least one further embodiment, it may be desirable to have one or more extra autonomous vehicles to extend the vehicle fence beyond the second roadway itself to cover any sidewalks at the nearest intersection, as illustrated in FIG. 3 and described in further detail below with respect to the description of FIG. 3.

Next, at 218, the vehicle fencing program 110A, 110B deploys the required number of autonomous vehicles to block the one or more objects from entering the nearest intersection prior to the emergency vehicle reaching the nearest intersection. In this manner, the vehicle fence may be formed. Depending upon the time at which the emergency vehicle is expected to reach the nearest intersection and the duration to clear the nearest intersection, one or more autonomous vehicles that are ahead of the emergency vehicle on the first roadway may be issued an electronic notification by the vehicle fencing program 110A, 110B, where the electronic notification may include when the deployed autonomous vehicles should begin to form the vehicle fence and for how long. Upon reaching the nearest intersection, each of the deployed autonomous vehicles may align in a liner direction along one or more edges of the first roadway within the nearest intersection, as illustrated in FIG. 3. Each of the deployed autonomous vehicles may align in a manner consistent with the moving direction of the one or more objects. For example, where the first roadway extends east and west, one edge of the first roadway may be a north edge and another edge may be a south edge. If the one or more objects are moving along the second roadway from north to south, then the deployed autonomous vehicles may align along the north edge, as illustrated in FIG. 3.

Furthermore, a gap between each of the aligned autonomous vehicles may be adjusted based on a type of the one or more objects at the nearest intersection. For example, the gap may need to be smaller when the one or more objects are pedestrians and/or bicycles than when the one or more objects are other vehicles. Thus, the gap may be adjusted dynamically based on the size of the one or more objects in order to properly block the one or more objects from crossing the nearest intersection.

According to at least one embodiment, the deployed autonomous vehicles may perform an action to remove at least one object of the one or more objects that is already in the nearest intersection. A non-limiting example of the action taken by the autonomous vehicle may be one or more horn honks to clear the nearest intersection. For example, when an animal is standing within the nearest intersection, the deployed autonomous vehicles may honk to remove the animal from the intersection.

While aligned, according to at least one other embodiment, each of the deployed autonomous vehicles may come to a complete stop to block the one or more objects from entering the nearest intersection. According to at least one further embodiment, each of the deployed autonomous vehicles may be moving to block the one or more objects from entering the nearest intersection. For example, the deployed autonomous vehicles may form a moving roadblock. In either embodiment, at least one aligned deployed autonomous vehicle may display a message on one or more windows of the autonomous vehicle. The message may include information including, but not limited to, when each of the aligned deployed autonomous vehicles will depart the nearest intersection, a context of the emergency (e.g., fire or medical emergency), and/or a type of emergency vehicle requiring safe passage (e.g., ambulance, police car, or fire truck).

Then, at 220, the vehicle fencing program 110A, 110B clears each of the deployed autonomous vehicles from the nearest intersection. Once the deployed autonomous vehicles have been cleared, the one or more objects may be once again free to cross at the nearest intersection. According to at least one embodiment, the deployed autonomous vehicles may be cleared after the emergency vehicle has passed through the nearest intersection, as detected from the real-time video feed. According to at least one other embodiment, the deployed autonomous vehicles may be cleared when no more objects are attempting to cross the nearest intersection, also as detected from the real-time video feed.

Referring now to FIG. 3, an exemplary diagram 300 depicting autonomous vehicles forming a vehicle fence for safe movement of an emergency vehicle is shown according to at least one embodiment. In the diagram 300, a first set of autonomous vehicles 302A and an emergency vehicle at a first time 304A are driving on the first roadway. The first set of autonomous vehicles 302A may be the autonomous vehicles before deployment to the nearest intersection, and the emergency vehicle at a first time 304A may be a time prior to entering the nearest intersection. The one or more objects on the second roadway, such as animals 306 and bicycles 308, may be attempting to cross the first roadway in the direction of the second roadway. To block the animals 306 and bicycles 308 from crossing the first roadway, a second set of autonomous vehicles 302B (i.e., the deployed autonomous vehicles) may gradually align along an edge of the nearest intersection. According to the embodiment depicted in FIG. 3, the second set of autonomous vehicles 302B may include an extra autonomous vehicle such that the vehicle fence covers the sidewalks at the nearest intersection. In this manner, the emergency vehicle at a second time 304B may safely pass through the nearest intersection.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

Figure 4:
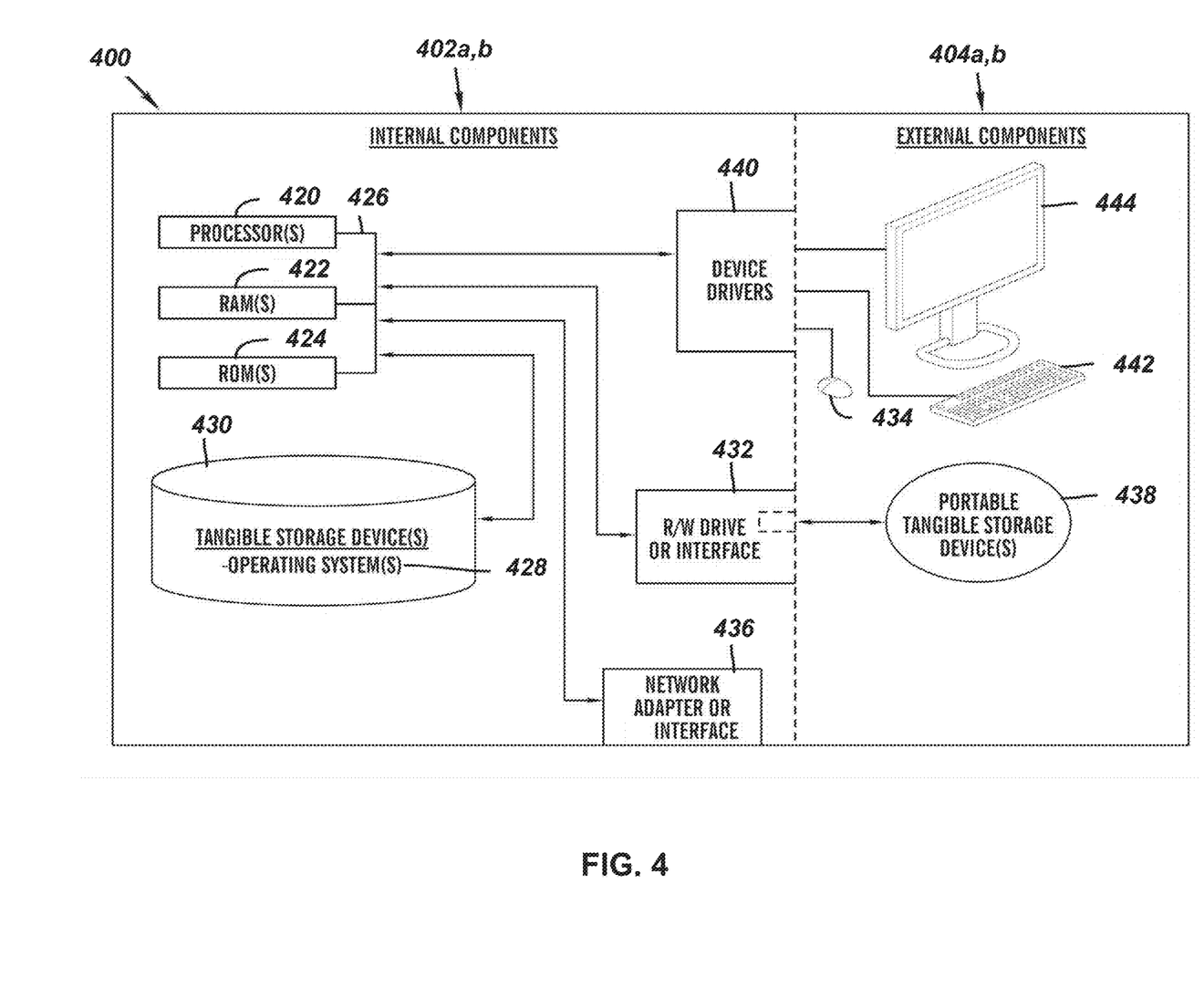
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the vehicle fencing program 110A in the client computing device 102 and the vehicle fencing program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the vehicle fencing program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the vehicle fencing program 110A in the client computing device 102 and the vehicle fencing program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the vehicle fencing program 110A in the client computing device 102 and the vehicle fencing program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
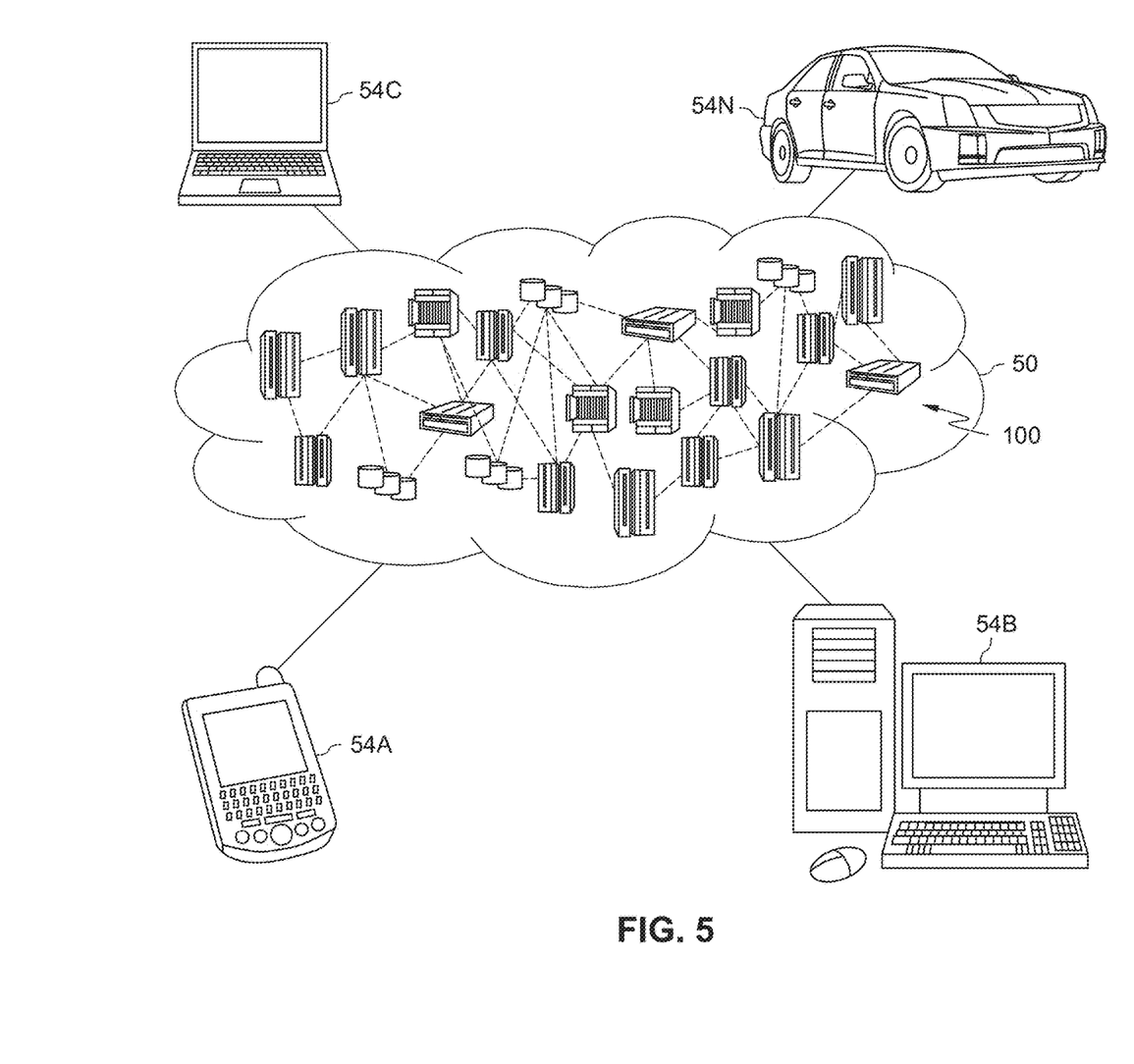
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
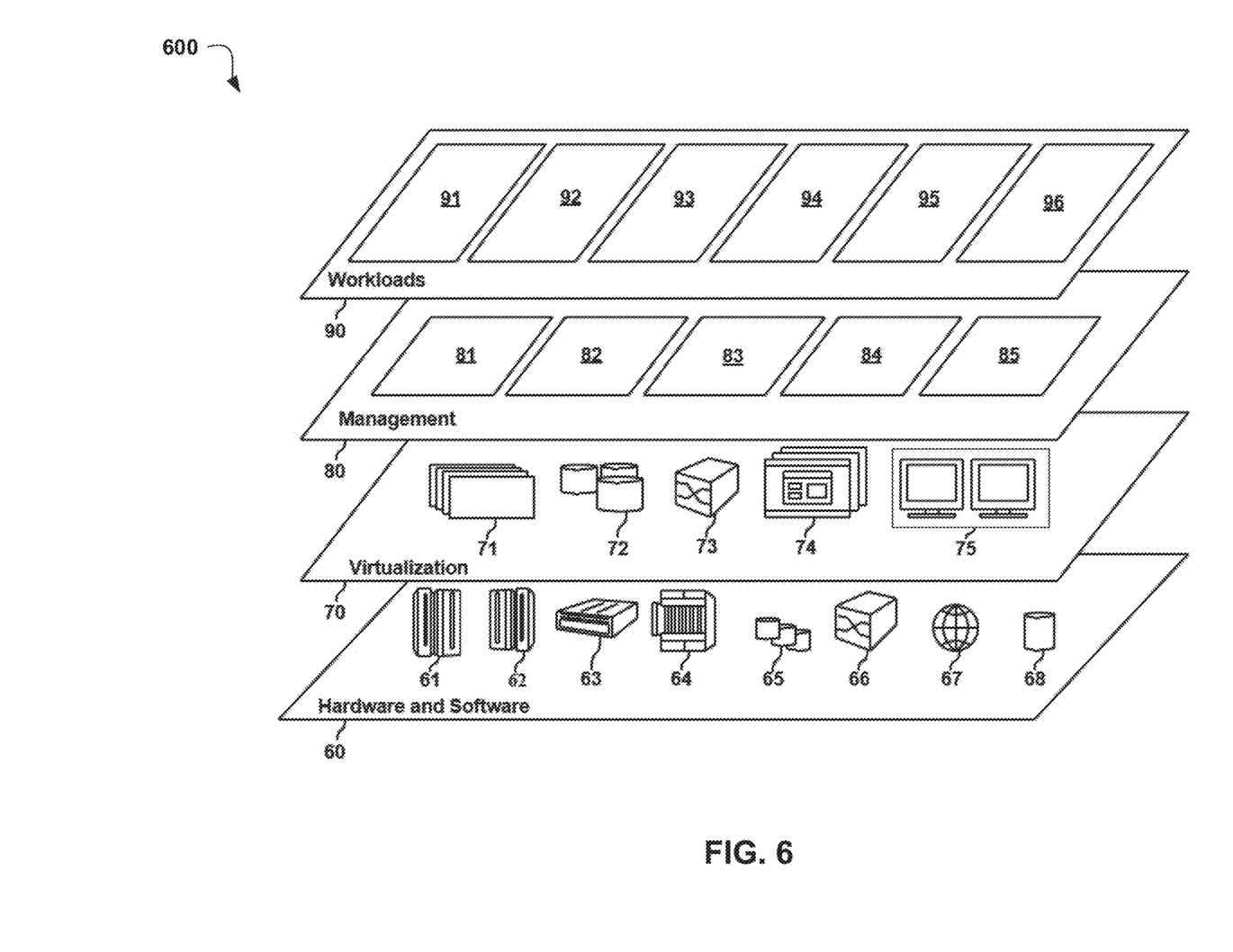
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamically creating a vehicle fence for emergency vehicle movement 96. Dynamically creating a vehicle fence for emergency vehicle movement 96 may relate to identifying a required number of autonomous vehicles to block one or more objects from entering a nearest intersection in order to deploy the required number of autonomous vehicles to block the one or more objects from entering the nearest intersection.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of dynamically creating a vehicle fence for emergency vehicle movement, the method comprising:
   receiving GPS data from one or more vehicles in a surrounding environment and a real-time video feed of one or more intersections along a first roadway;
   identifying a number of autonomous vehicles and one or more routes of the autonomous vehicles traveling on the first roadway based on the GPS data;
   determining whether an emergency vehicle is traveling on the first roadway;
   in response to determining the emergency vehicle is traveling on the first roadway, identifying a route and a speed of the emergency vehicle based on the GPS data;
   estimating a width of a second roadway intersecting the first roadway at a nearest upcoming intersection to the emergency vehicle based on the real-time video feed, wherein the width of the second roadway is estimated based on a number of white and yellow lines on the second roadway;
   identifying a moving direction of one or more objects along the second roadway based on the real-time video feed;
   detecting a time at which the emergency vehicle will reach the nearest upcoming intersection, and a duration to clear the nearest upcoming intersection based on the route and the speed of the emergency vehicle;
   identifying a required number of the autonomous vehicles to block the one or more objects from entering the nearest upcoming intersection based on the number of white and yellow lines on the second roadway;
   deploying the required number of the autonomous vehicles to block the one or more objects from entering the nearest upcoming intersection prior to the emergency vehicle reaching the nearest upcoming intersection, wherein deploying the required number of the autonomous vehicles to block the one or more objects from entering the nearest upcoming intersection further comprises aligning each of the deployed autonomous vehicles in a linear direction along one or more edges of the first roadway within the nearest upcoming intersection consistent with the moving direction of the one or more objects; and
   clearing each of the deployed autonomous vehicles from the nearest upcoming intersection.

2. The computer-based method of claim 1, wherein the deployed autonomous vehicles perform an action to remove at least one object of the one or more objects that is already in the nearest upcoming intersection.

3. The computer-based method of claim 1, wherein a notification is sent to the one or more vehicles in the surrounding environment informing the one or more vehicles about a context of an emergency.

4. The computer-based method of claim 1, wherein a gap between each of the aligned deployed autonomous vehicles is adjusted based on a type of the one or more objects at the nearest upcoming intersection.

5. The computer-based method of claim 1, wherein at least one aligned deployed autonomous vehicle displays a message on one or more windows about when each of the aligned deployed autonomous vehicles will depart the nearest upcoming intersection.

6. The computer-based method of claim 1, wherein each of the aligned deployed autonomous vehicles comes to a complete stop to block the one or more objects from entering the nearest upcoming intersection.

7. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   receiving GPS data from one or more vehicles in a surrounding environment and a real-time video feed of one or more intersections along a first roadway;
   identifying a number of autonomous vehicles and one or more routes of the autonomous vehicles traveling on the first roadway based on the GPS data;
   determining whether an emergency vehicle is traveling on the first roadway;
   in response to determining the emergency vehicle is traveling on the first roadway, identifying a route and a speed of the emergency vehicle based on the GPS data;
   estimating a width of a second roadway intersecting the first roadway at a nearest upcoming intersection to the emergency vehicle based on the real-time video feed, wherein the width of the second roadway is estimated based on a number of white and yellow lines on the second roadway;

identifying a moving direction of one or more objects along the second roadway based on the real-time video feed;

detecting a time at which the emergency vehicle will reach the nearest upcoming intersection, and a duration to clear the nearest upcoming intersection based on the route and the speed of the emergency vehicle;

identifying a required number of the autonomous vehicles to block the one or more objects from entering the nearest upcoming intersection based on the number of white and yellow lines on the second roadway;

deploying the required number of the autonomous vehicles to block the one or more objects from entering the nearest upcoming intersection prior to the emergency vehicle reaching the nearest upcoming intersection, wherein deploying the required number of the autonomous vehicles to block the one or more objects from entering the nearest upcoming intersection further comprises aligning each of the deployed autonomous vehicles in a linear direction along one or more edges of the first roadway within the nearest upcoming intersection consistent with the moving direction of the one or more objects; and clearing each of the deployed autonomous vehicles from the nearest upcoming intersection.

8. The computer system of claim 7, wherein the deployed autonomous vehicles perform an action to remove at least one object of the one or more objects that is already in the nearest upcoming intersection.

9. The computer system of claim 7, wherein a notification is sent to the one or more vehicles in the surrounding environment informing the one or more vehicles about a context of an emergency.

10. The computer system of claim 7, wherein a gap between each of the aligned deployed autonomous vehicles is adjusted based on a type of the one or more objects at the nearest upcoming intersection.

11. The computer system of claim 7, wherein at least one aligned deployed autonomous vehicle displays a message on one or more windows about when each of the aligned deployed autonomous vehicles will depart the nearest upcoming intersection.

12. The computer system of claim 7, wherein each of the aligned deployed autonomous vehicles comes to a complete stop to block the one or more objects from entering the nearest upcoming intersection.

13. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving GPS data from one or more vehicles in a surrounding environment and a real-time video feed of one or more intersections along a first roadway;

identifying a number of autonomous vehicles and one or more routes of the autonomous vehicles traveling on the first roadway based on the GPS data;

determining whether an emergency vehicle is traveling on the first roadway;

in response to determining the emergency vehicle is traveling on the first roadway, identifying a route and a speed of the emergency vehicle based on the GPS data;

estimating a width of a second roadway intersecting the first roadway at a nearest upcoming intersection to the emergency vehicle based on the real-time video feed, wherein the width of the second roadway is estimated based on a number of white and yellow lines on the second roadway;

identifying a moving direction of one or more objects along the second roadway based on the real-time video feed;

detecting a time at which the emergency vehicle will reach the nearest upcoming intersection, and a duration to clear the nearest upcoming intersection based on the route and the speed of the emergency vehicle;

identifying a required number of the autonomous vehicles to block the one or more objects from entering the nearest upcoming intersection based on the number of white and yellow lines on the second roadway;

deploying the required number of the autonomous vehicles to block the one or more objects from entering the nearest upcoming intersection prior to the emergency vehicle reaching the nearest upcoming intersection, wherein deploying the required number of the autonomous vehicles to block the one or more objects from entering the nearest upcoming intersection further comprises aligning each of the deployed autonomous vehicles in a linear direction along one or more edges of the first roadway within the nearest upcoming intersection consistent with the moving direction of the one or more objects; and clearing each of the deployed autonomous vehicles from the nearest upcoming intersection.

14. The computer program product of claim 13, wherein the deployed autonomous vehicles perform an action to remove at least one object of the one or more objects that is already in the nearest upcoming intersection.

15. The computer program product of claim 13, wherein a notification is sent to the one or more vehicles in the surrounding environment informing the one or more vehicles about a context of an emergency.

16. The computer program product of claim 13, wherein a gap between each of the aligned deployed autonomous vehicles is adjusted based on a type of the one or more objects at the nearest upcoming intersection.

17. The computer program product of claim 13, wherein at least one aligned deployed autonomous vehicle displays a message on one or more windows about when each of the aligned deployed autonomous vehicles will depart the nearest upcoming intersection.

\* \* \* \* \*